United States Patent [19]

DeHaitre

[11] Patent Number: 5,595,466
[45] Date of Patent: Jan. 21, 1997

[54] DOUBLE SLOT SPANNER LOCKNUT

[75] Inventor: Lon DeHaitre, Arlington Heights, Ill.

[73] Assignee: Abbott-Interfast Corporation, Wheeling, Ill.

[21] Appl. No.: 449,762

[22] Filed: May 25, 1995

[51] Int. Cl.$^6$ .............................. F16B 19/06; F16B 39/34
[52] U.S. Cl. ............................................ 411/303; 411/505
[58] Field of Search ........................... 411/303, 402, 411/403, 405, 427

[56] References Cited

U.S. PATENT DOCUMENTS

| | | | |
|---|---|---|---|
| 1,302,854 | 5/1919 | Redmer | 411/405 X |
| 2,450,694 | 10/1948 | Sauer | 411/303 |
| 4,004,626 | 1/1977 | Biblin et al. | 411/303 X |
| 4,907,924 | 3/1990 | Hellon | 411/303 |
| 5,020,953 | 6/1991 | Wada | 411/405 X |

*Primary Examiner*—Neill R. Wilson
*Attorney, Agent, or Firm*—Greer, Burns & Crain, Ltd.

[57] ABSTRACT

A low profile double slot spanner locknut for engaging a threaded fastener having a substantially ring-shaped main body including a round outside edge, a hollow lower interior engagement portion and a hollow coined lip, portion. Two adjustment slots are positioned about 180° apart on the outside edge and are used by a spanner drive tool for installing and adjusting the locknut. An impressionable nylon insert is positioned in a cavity in the coined lip portion. The insert is configured to further engage the thread of the fastener impressing the thread into the insert for self-locking during installation of the locknut.

3 Claims, 1 Drawing Sheet

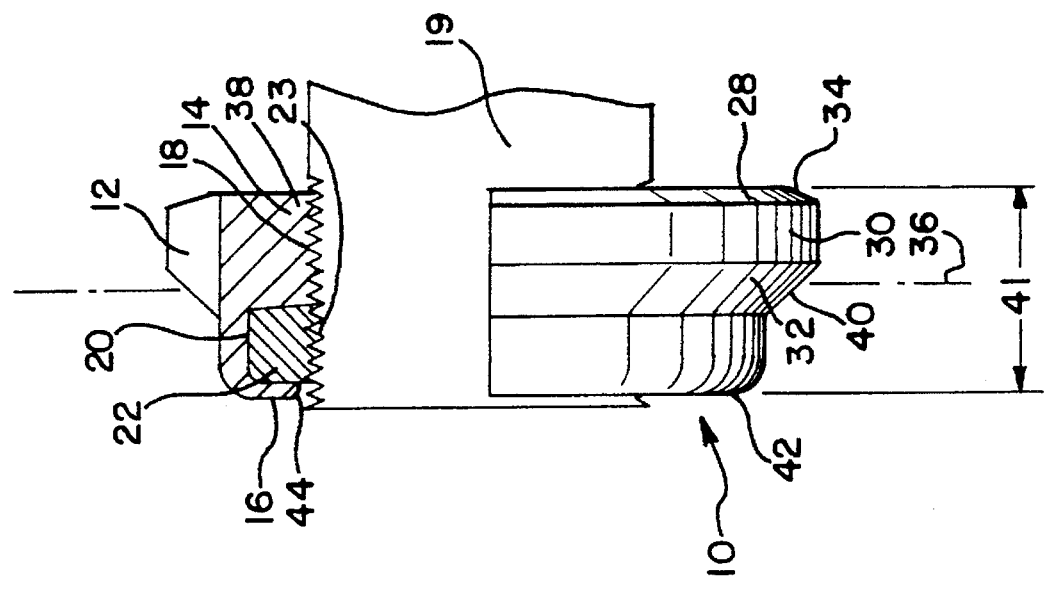
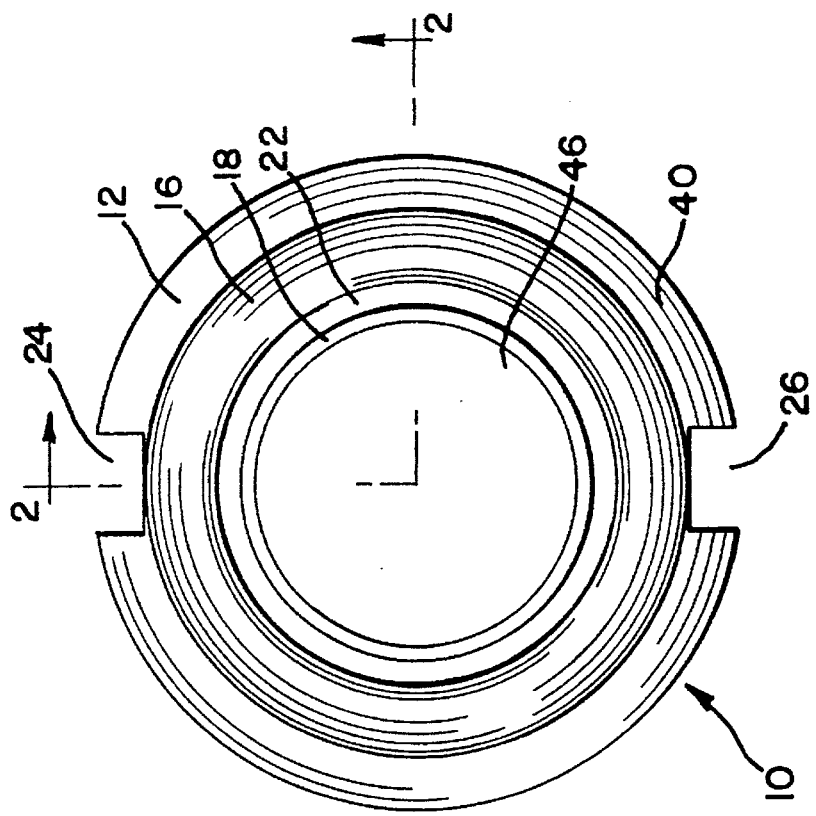

DOUBLE SLOT SPANNER LOCKNUT

BACKGROUND OF THE INVENTION

1. Field of the Invention

The present invention relates to fasteners and threaded nuts. More particularly, the present invention relates to low profile slotted spanner locknuts having at least two spanner slots.

2. Background of the Invention

Conventional fasteners include bolts in combination with nuts. The most common nuts have a multi-faceted outer edge, and can be easily installed or removed with commonly available wrenches and sockets. When easy removal is not desired, however, nuts having a rounded outer edge are often used to discourage tampering or adjustment. A key of some sort is provided for installation or adjustment with a specially designed tool.

A low profile is sometimes desirable for rounded nuts, for appearance purposes and to make undesired removal or adjustment more difficult. However, low profile nuts have fewer threads, making lasting engagement with a bolt more difficult to achieve. For this and perhaps other reasons including to prevent loosening, a nylon or other plastic insert is sometimes used with such low profile nuts, to lock its position after installation. Nuts which have such inserts are commonly called locknuts. Keyed, low profile locknuts are used in many applications because they are tamper resistant.

The key in low profile locknuts can include spaced opposing orifices which span the center of the locknut. Such nuts are called spanner locknuts. Spanner drives having projections which fit in the orifices are used to install spanner locknuts.

Locknuts have also been manufactured which contain a single slot on the outside edge for installation with a specifically adapted installation tool. Such locknuts are generally not intended to be reusable and discourage easy adjustment. However, installation of single slot spanner locknuts is difficult to automate and can result in an unbalanced torque loading condition when the locknut is seated. Furthermore, single slot locknuts allow a relatively low degree of angularity between the tool and the axis of the nut during installation, and substantial rotation of the installation tool is sometimes needed to engage the tool with the nut.

Thus, there is a need for low-profile, effective and cosmetic locknuts which can be easily and efficiently adjusted after installation, which provide balanced load conditions, and which can be re-used, if desired. There is also a need for tamper resistant slotted locknuts which allow a relatively high degree of angularity between the installation tool and the nut, and do not require substantial rotation of the tool to engage the nut.

SUMMARY OF THE INVENTION

Accordingly, one object of the present invention is to provide an improved spanner locknut.

It is another object of the present invention to provide an improved spanner locknut which can be easily adjusted or reused.

It is still another object of the present invention to provide an improved spanner locknut which provides a balanced load condition when the locknut is seated.

It is a further object of the present invention to provide an improved spanner locknut which tolerates a greater angle between the spanner drive tool and the axis of the locknut during installation.

It is a still further object of the present invention to provide an improved spanner locknut whose installation can be easily automated.

The present invention provides an improved low profile double slot spanner locknut for engaging a threaded fastener such as a bolt or screw.

The spanner locknut includes a substantially ring-shaped main body having a round outer edge, a threaded lower interior engagement portion for engaging the fastener, a hollow coined lip portion and at least two adjustment slots positioned on the outer edge for installing and adjusting the spanner locknut. Preferably, the slots are positioned 180° apart on the outer edge. An impressionable nylon insert is positioned in a cavity in the coined lip portion. The insert is impressed with and compressed by the thread from the male fastener during installation and further engages the threads.

BRIEF DESCRIPTION OF THE DRAWINGS

Other features and advantages of the present invention will be apparent from the following description taken in conjunction with the accompanying drawings, in which:

FIG. 1 is a top view of an improved low profile double slot spanner locknut made in accordance with the principles of this invention, and FIG. 2 is a side view of the locknut of FIG. 1, partially shown in cross section taken along lines 2—2 in FIG. 1.

DESCRIPTION OF THE PREFERRED EMBODIMENT

Preferred embodiments of an improved low profile double slot spanner locknut are described herebelow with reference to the drawings.

Referring now to FIGS. 1 and 2, a low profile double slot spanner locknut 10 has a substantially ring-shaped configuration, and includes an outer edge 12, a hollow lower interior engagement portion 14 and a hollow coined lip portion 16 to encapsulate an insert 22 into the top of the nut 10.

The lower interior engagement portion 14 contains threads 18 which are configured to engage the threaded portion of a fastener 19, thus securing the locknut 10 in place on the fastener 19.

The coined lip portion 16 forms an inner cavity 20. An impressionable insert 22, usually made from nylon, can be positioned in the inner cavity 20. The insert 22 is configured to further engage the threaded portion of the fastener 19, creating prevailing locking torque with the fastener 19. The threads 23 are impressed into the insert 22 and the insert 22 also acts to dampen vibration transfer.

Two adjustment slots 24, 26 are positioned about 180° apart on the outer edge 12. The slots 24, 26 are used to install and adjust the locknut 10. A spanner drive engages the slots 24, 26 and rotates the locknut 10, screwing the locknut 10 onto the threaded portion of the fastener 19. Alternatively, the spanner drive acts to hold the locknut 10 in place while the fastener 19 is rotated.

In the preferred embodiment, the outer edge 12 is made up of a bottom portion 28, a middle portion 30 and a top portion 32. The outside 34 of the bottom portion 28 may be beveled, angled or radiused and the inside 38 can be beveled at an angle of between 45° and 60° relative to the axis 36. The middle portion 30 is substantially straight and is larger than both the bottom portion 28 and top portion 32. The outside 40 of the top portion 32 may be beveled at an angle of between 38° and 42° relative to the axis 36. The inside surfaces of both the middle portion 30 and top portion 32 are substantially straight and smooth.

In the preferred embodiment, the profile 41 of the locknut 10 is configured to be of a low protrusion relative to the thread diameter involved. The inside diameters of the bottom, middle and top portions, 28, 30 and 32, the outside diameter, and the outer edge 12 are all appropriately sized.

The coined lip portion 16 is sized to satisfy the desired prevailing locking torque. The outside surface of the coined lip portion 16 is substantially straight and captivated by a rounded back edge 42. The inside surface of the coined lip portion is also substantially straight contained by a rounded back edge 44 forming a throughbore 46 through which the end of the male threaded fastener 19 is driven.

The outer edge 12 includes adjustment slots 24 and 26. The slots 24, 26 are located about 180° apart and are sized proportionate to driving the specific application requirements.

The nylon insert 22 is configured to fit inside the cavity 20 captivated by the coined lip portion 16. The insert 22 engages the threaded portion of a fastener 19, such as a bolt, locking the locknut 10 into place on the fastener 19. The nylon insert 22 also acts to dampen vibrations.

The present locknut can be made by first making a blank ring-shaped nut by turning, forming or cold-forming or die casting. The engagement slots 24, 26 are then milled out of the blank nut using a milling machine or primary forming tooling.

One advantage of the present spanner locknut is that the locknut can be easily re-seated or re-used, using an appropriate tool. The double slot construction makes it practical to remove or adjust the present spanner locknut. In a single slot construction, once the locknut is set in place it is relatively difficult to obtain sufficient angularity for the tool to unseat the locknut without damaging the nut or finish. Furthermore, in the single slot construction the angular removal forces are concentrated at or near the slot, which further contributes to the deterioration of the nut body or finish.

The present double-slot spanner locknut allows greater mechanical advantage between the spanner drive tool and the axis of the locknut. This construction also helps to balance the angular removal forces across the locknut. Because the angular forces are balanced, the possibility of damaging the nut body or finish is reduced.

Another advantage of the present double slot spanner locknut is that it is easier to obtain a balanced pre-load when the locknut is seated. Because the double slot construction balances the angular forces applied to the locknut during installation, the locknut can be more easily installed in an even, level manner. The result is that the installed locknut is positioned so as to be perpendicular to the body of the fastener to which it is attached. In a single slot construction, the locknut can be seated slightly oblique to the body of the fastener, which causes the pre-load forces to be concentrated in certain areas instead of being distributed evenly throughout the entire locknut.

A further advantage of the present invention is that installation of the locknut on a fastener is more efficient and easier to automate. Spanner locknuts are installed using spanner drives. In an assembly line, the spanner drives are generally attached to powered tools. Installation is accomplished by applying the spanner drive to the locknut and rotating the spanner drive until it engages the adjustment slot provided on the edge of the locknut, thus screwing the locknut onto the threaded portion of a fastener. In a single slot construction, it is possible that the spanner drive may have to rotate about 350° before engaging the locknut. In the double slot construction of the present invention, the spanner drive rotates only approximately half the diameter or less before engaging the locknut.

It will be appreciated that the above-disclosed embodiment is well calculated to achieve the aforementioned objectives of the present invention. In addition, it is evident that those skilled in the art, once given the benefit of the foregoing disclosure, may now make modifications of the specific embodiment described herein without departing from the spirit of the present invention. Such modifications are considered within the scope of the present invention which is limited solely by the scope and spirit of the appended claims.

What is claimed is:

1. A slotted spanner locknut comprising: a substantially ring-shaped main body having a round outside edge and a hollow lower interior engagement portion for engaging a fastener including a threaded portion;

only two adjustment slots positioned on said edge, said slots being positioned about 180° apart on said outside edge;

a hollow coined lip portion containing an insert cavity; and a substantially ring-shaped, impressionable, nylon self-locking insert positioned inside said insert cavity for engaging the threaded portion of the fastener and impressing a thread on said insert.

2. A slotted spanner locknut comprising:

a substantially ring-shaped main body having a round outside edge, a lower hollow interior engagement portion for engaging a fastener having a threaded portion and a hollow coined lip portion having an insert cavity;

only two adjustment slots positioned 180° apart on said outside edge; and a substantially ring-shaped impressionable self-locking nylon insert positioned inside said insert cavity for further engaging a threaded portion of the fastener and impressing a thread on said insert.

3. The locknut as defined in claim 2 wherein said main body includes a top portion which is beveled at an angle of between 38° and 42° relative to a longitudinal axis of the locknut.

* * * * *